United States Patent
Marzen et al.

(10) Patent No.: US 7,573,466 B1
(45) Date of Patent: Aug. 11, 2009

(54) METHOD AND APPARATUS FOR DATA ENTRY FOR A LIQUID CRYSTAL DISPLAY

(75) Inventors: Vincent P. Marzen, Robins, IA (US); Albert N. Stuppi, Springville, IA (US); Gary D. Bishop, Marion, IA (US); Birendra Bahadur, Cedar Rapids, IA (US); Michael R. Jones, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1056 days.

(21) Appl. No.: 10/664,214

(22) Filed: Sep. 17, 2003

(51) Int. Cl.
*G06F 3/043* (2006.01)
(52) U.S. Cl. .................... 345/177; 178/18.04; 367/113
(58) Field of Classification Search ......... 345/173–183; 178/18.04, 18.03; 367/113
See application file for complete search history.

(56) References Cited

U.S. PATENT DOCUMENTS 3,720,948 A * 3/1973 Eichen et al. ............... 345/418
3,775,560 A 11/1973 Ebeling et al.
4,888,599 A 12/1989 Harwood et al.
5,097,415 A * 3/1992 Yoshimura et al. ....... 178/18.04
5,402,151 A * 3/1995 Duwaer ...................... 345/173
5,717,432 A * 2/1998 Miwa et al. .............. 178/18.04
6,335,725 B1 * 1/2002 Koh et al. ................... 345/173
6,504,530 B1 * 1/2003 Wilson et al. ............... 345/173
6,590,569 B1 * 7/2003 Toda .......................... 345/173
6,891,530 B2 * 5/2005 Umemoto et al. ........... 345/173
6,933,930 B2 * 8/2005 Devige et al. ............... 345/173

OTHER PUBLICATIONS

Two pages entitled "Touch Screen Technology" printed from the Internet from Spire Controls web page, which Applicants admit to be prior art to the present invention.
Two pages printed from the web site "Whatis.com Target Search" defining "touch screen", which Applicants also admit to be prior art to the present invention.

* cited by examiner

*Primary Examiner*—Kevin M Nguyen
(74) *Attorney, Agent, or Firm*—Daniel M. Barbieri

(57) ABSTRACT

A touch screen for LCDs which uses a plurality of shockwave detectors disposed around the periphery of the viewing area to detect the location of a touch or tap which is the point of origin of an expanding shockwave.

20 Claims, 1 Drawing Sheet

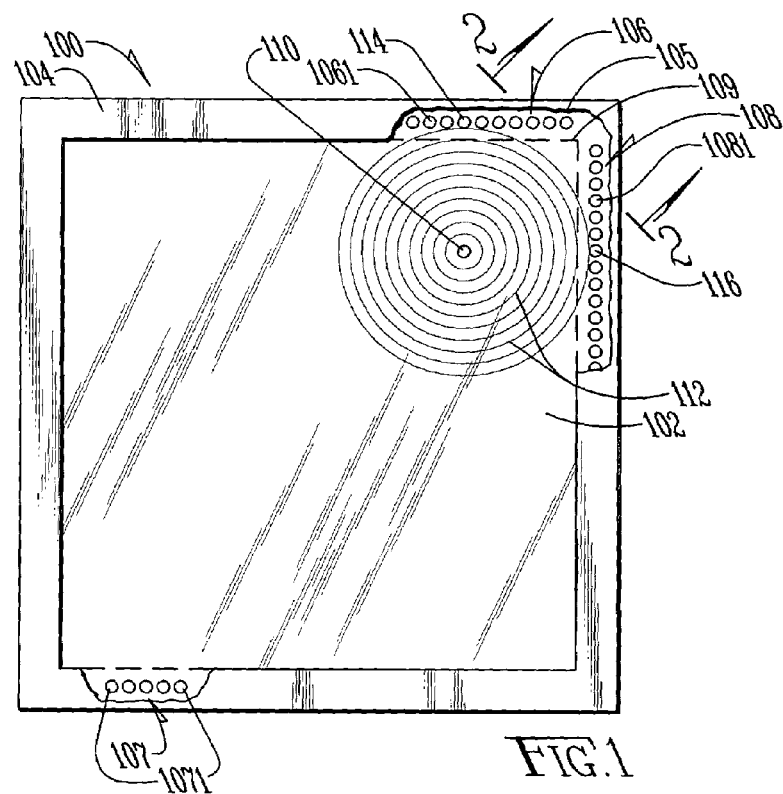
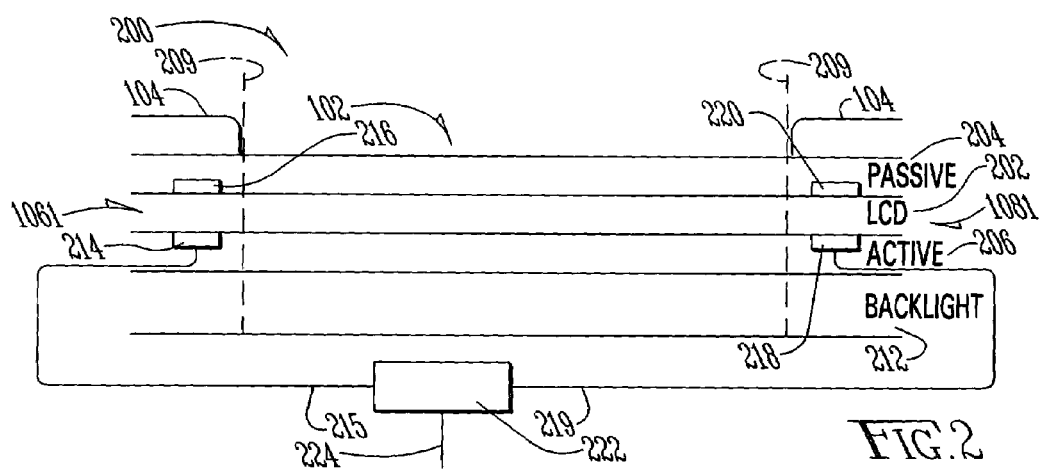
FIG.1
FIG.2

METHOD AND APPARATUS FOR DATA ENTRY FOR A LIQUID CRYSTAL DISPLAY

FIELD OF THE INVENTION

The present invention generally relates to liquid crystal displays (LCDs), and more particularly relates to touch screen data entry LCDs, and even more particularly relates to methods and apparatus for detecting a touch or tap upon a screen of LCDs.

BACKGROUND OF THE INVENTION

In the past, LCDs have been used in a wide variety of environments, including displays within the cockpit of an aircraft. In some aircraft, it is desirable to have touch screen LCDs. Many of these touch screen displays use transparent and conductive layers across the viewing surface to effect the touch screen capabilities. Other prior art systems use pairs of light transmitters and detectors disposed around the periphery of the display. These light transmitter and detector pairs are similar to what is shown in U.S. Pat. No. 3,775,560 assigned to the University of Illinois Research Foundation.

While these LCD touch screen systems may have many advantages in particular uses, they also have created challenges. One common challenge created by the conductive layer type touch screen sensor is the degradation of the image to be viewed. Another problem with the prior art light transmitter/sensor pair type of touch screen, in addition to the relatively high cost, occurs when these light transmitter/sensor pairs are used when a pilot is using a night vision imaging system, hereafter NVIS. These light transmitters can interfere with the optimal performance of an NVIS.

Consequently, there exists a need for improved methods and apparatus for data entry into LCDs, via touch screens.

SUMMARY OF THE INVENTION

It is an object of the present invention to provide LCD touch screen capabilities.

It is another object of the present invention to provide an LCD with improved performance over many prior art touch screens.

It is a feature of the present invention to utilize a plurality of shockwave detectors disposed about the perimeter of the viewing surface.

It is an advantage of the present invention to avoid the known shortcomings of the conductive layer and light transmitter/sensor pair type of touch screens.

The present invention is an apparatus and method for providing data entry, via touch screen, for an LCD which is designed to satisfy the aforementioned needs, provide the previously stated objects, include the above-listed features and achieve the already articulated advantages. The present invention is carried out in an "increased reflection-less and image degradation-less" manner in a sense that the increased reflection and/or image degradation associated with a conductive layer type of touch screen over the viewing surface has been eliminated, or at least greatly reduced. Additionally, the present invention is carried out in a "light pollution-less" manner in the sense that the undesirable light associated with the light transmitter/detector pair type of touch screen has been eliminated, or at least greatly reduced.

Accordingly, the present invention is an LCD touch screen system including a plurality of shockwave sensors disposed about the periphery of the viewing surface of an LCD, where the shockwave sensors detect shockwaves which emanate from a point on the screen that is touched.

BRIEF DESCRIPTION OF THE DRAWINGS

The invention may be more fully understood by reading the foregoing description of the preferred embodiments of the invention, in conjunction with the appended drawings wherein:

FIG. 1 is a simplified perspective and partially cut-away diagram of the LCD touch screen system of the present invention, which includes a peripheral array of shockwave sensors exposed in the cut-away section. The concentric circles on the face of the viewing surface represent shockwaves emanating from a point that has been tapped by a user.

FIG. 2 is a simplified view of the several layers of the LCD display showing the details of the shockwave sensors.

DETAILED DESCRIPTION

Now referring to the drawings wherein like numerals refer to like matter throughout, and more specifically to FIG. 1, there is shown an LCD with touch screen system of the present invention, generally designated 100. The description herein focuses upon LCD systems used in the cockpit of an aircraft because it is believed that many of the features of the present invention are particularly well suited for use in an aviation environment. However, it should be understood that other environments are equally applicable, and they are intended to be included within the scope of the present invention. LCD system 100 includes a viewing surface 102, which could be any type of liquid crystal material, but a multi-domain vertically aligned liquid crystal may be preferred. A bezel 104 is shown about the periphery of the viewing surface 102. A jagged cut-away line 105 represents an edge of a portion of the bezel 104 which is cut away. The dashed line 109 represents the location of the normal edge of bezel 104 without being cut away. A top periphery array 106 of shockwave sensors is shown exposed. Similarly, a bottom periphery array 107 and a right periphery array 108 of shockwave sensors are shown exposed as well. The number of individual shockwave detectors in each array depends upon the type of method used to pinpoint the location of the touch. Each array could be just one sensor, such as sensors 1061, 1071, and 1081 if a triangulation approach is used to pinpoint the location. If a row and column approach is used, then many sensors would be needed, depending upon the degree of precision that can be achieved with the touch screen system. A tap or touch point 110 is shown with a plurality of concentric circles 112 representing shockwaves emanating therefrom as a result of a finger or stylus tapping the viewing surface 102. The larger concentric circles 112 represent positions of an expanding wavefront of a shockwave as time increases.

With respect to the triangulation method, the relative time of arrival of the shockwave is measured at each of the sensors 1061, 1071, and 1081. Then a triangulation computation is used to pinpoint the location of tap. The exact triangulation method used could depend upon the number of sensors used and the characteristics of propagation of a shockwave in the particular liquid crystal material. Propagation rates may also be calibrated for temperature and also may be adjusted, depending on the amount of information being displayed during the propagation. In another embodiment, one might only read the activated sensors in between frames in the field of data. Also, assuming the shockwave propagates through the liquid crystal material at a known propagation rate, then as few as three (3) sensors could be used to pinpoint the location.

Since propagation rates may vary, depending upon environmental conditions of the liquid crystal material, additional sensors could be employed in the determination of the location of the tap. Economic and performance requirements may be important in determining the number of sensors and the triangulation method employed.

With respect to the row and column approach with its many sensors, the first shockwave top detection point 114 is a location of one of the top array 106 of sensors which is first contacted by a shockwave. First shockwave right detection point 116 is a location of a first one of the right array 108 of shockwave sensors which detects a shockwave emanating from touch point 110.

Now referring to FIG. 2, there is shown a cross-sectional view generally designated 200, of an LCD 100 taken on line 2-2 of FIG. 1. Viewing surface 102 is shown between sections of bezel 104. Viewable area boundary line 209 is shown as a dashed line extending below the bezel 104 and indicating the boundary between the viewable and non-viewable areas. The LCD 100 includes a liquid crystal material 202. Liquid crystal material 202 is preferably a multi-domain vertically aligned liquid crystal material, but other types of liquid crystal material could be used as well, with appropriate adjustments being made. An active electronic element 206 is shown disposed below liquid crystal material 202. Active electronic element 206 could be a layer of electronics, such as thin film transistors (TFTs). Note the relative thickness of the liquid crystal material 202, active electronic element 206 and passive optical element 204 are not as shown in the drawing. Passive optical element 204 could be a polarizer or other optical element with some known level of reflectivity. Backlight 212 is shown disposed behind the active electronic element 206. In a preferred embodiment of the present invention, top array 106 of shockwave detectors includes first detector 106₁, which can be any type of detector, including electrical sensors, optical sensors, etc. First opto-electronic sensor 214 is shown disposed in the non-viewable section of the display and is preferably a light sensor which detects the level of light incident thereon from above; i.e., passing through the liquid crystal material 202. First reflection area 216 can be an element disposed on passive optical element 204 or merely a segment of passive optical element 204. Similarly, on the opposing side of viewing surface 102, there is shown second opto-electronic sensor 218 and second reflection area 220. The reflection here may be full or partial reflection. In some embodiments, it may be desirable to pass one polarization state and reflect others. Still other types of partial or selective reflectors could be employed. First opto-electronic sensor 214 and second opto-electronic sensor 218 have first signal line 215 and second signal line 219 respectively carrying a signal representative of a measured characteristic of the liquid crystal material 202. Location determination processor 222 accepts signals from first signal line 215, second signal line 219 and third signal line 224 and generates a determination of a location of a point on viewing surface 102 where a tap occurred. Location determination processor 222 can be any type of device which performs the function of making location determination, such as a microprocessor, a dedicated co-processor, shared processor, dedicated circuitry, combinations of hardware and software, etc.

In operation, the apparatus and method of the present invention could function as follows:

In the triangulation approach: a user touches a touch point 110 on viewing surface 102. A shockwave emanates from the touch point and travels toward the periphery of the viewing surface. The shockwave is detected by sensor 106₁, then by sensor 108₁ and finally by sensor 107₁. The relative times of arrival are determined. Using triangulation techniques, the location of touch point 110 is determined. Of course, more than three sensors could be employed with the triangulation method. The term "triangulation" is used herein to refer to a method where the magnitude or duration of a relative time delay is used to determine location of a touch point 110. This is distinguished from the row and column approach where the magnitude or duration of the relative time delay is not necessary. Only the fact that one sensor detects before another does is needed.

In the row and column approach, a user touches touch point 110 on viewing surface 102. A shockwave emanates from the touch point and propagates toward the periphery of the viewing surface. The shockwave is detected at a first shockwave top detection point 114, because of its proximity to the touch point 110. A first shockwave right detection point 116 is closest to the touch point 110; so it detects the shockwave on the right side sooner than all others. The top array 106 of shockwave detectors and right array 108 of shockwave detectors essentially define a grid of rows and columns. The location of the touch point 110 can be determined by detecting the first shockwave top detection point 114, which determines the column associated with touch point 110 and first shockwave right detection point 116, which determines the row of touch point 110. Additional arrays of shockwave detectors can be deployed along the entire periphery of the viewing surface 102. These additional arrays could provide additional or redundant sources of information. Top array 106 of shockwave detectors may be configured to detect changes in capacitance, resistance, other electrical characteristics, polarization state, transmissivity, or other optical or electro-optical characteristics of the liquid crystal media which may change as a function of presence of a shockwave propagating through said liquid crystal material.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

We claim:

1. A touch screen display apparatus comprising:
   a liquid crystal panel having a viewing area with a periphery;
   a plurality of shockwave detectors, disposed about said periphery; and
   said plurality of shockwave detectors configured to use a time of arrival of a tap-generated shockwave to determine a point of origin of the tap-generated shockwave in the liquid crystal panel which results from a touch occurring at said point of origin.

2. A display of claim 1 wherein said periphery is free from a plurality of pairs of opposing transmitters and receivers disposed about said periphery where said plurality of pairs of opposing transmitters and receivers are configured to detect a presence of an object disposed on the viewing area and between said transmitters and said receivers.

3. A display of claim 2 wherein said viewing area is free from an electrically conductive transparent layer and free from a connection to an electronic detection means which is configured to detect touching.

4. A display of claim 1 further comprising:
   a first array of shockwave detectors, disposed along a horizontal edge, which define a plurality of columns across said viewing area; and, a second array of shockwave detectors, disposed along a vertical edge, which defines a plurality of rows across said viewing area.

5. A display of claim 4 further comprising a third array of shockwave detectors opposite said first array of shockwave detectors and a fourth array of shockwave detectors opposite the second array of shockwave detectors.

6. A display of claim 4 wherein said liquid crystal panel is a multi-domain vertically aligned liquid crystal cell.

7. A display of claim 6 further comprising:
   means for determining a location of a tactile interaction on said viewing area by analyzing a time of arrival difference of a shockwave, due to said tactile interaction, on at least two non-co-located points.

8. A display of claim 7 further comprising an active thin film transistor layer in said liquid crystal panel; and,
   wherein said first array of shockwave detectors is integrated into said thin film transistor layer.

9. A display of claim 8 wherein said first array of shockwave detectors is configured to detect a change of capacitance of said liquid crystal material in response to presence of a shockwave.

10. A display of claim 8 wherein said first array of shockwave detectors is configured to detect a change of resistance of said liquid crystal material in response to presence of a shockwave.

11. A method of detecting a touch on a viewing panel of a liquid crystal display, comprising the steps of:
   providing a display panel comprising a liquid crystal material, said display having a viewing area;
   tapping a first location on said viewing area and thereby generating a shockwave as a result of such tapping;
   providing a plurality of shockwave detectors which are not located at a single location;
   detecting an arrival of said shockwave at each of said plurality of shockwave detectors;
   determining a time of arrival of said shockwave at each of said plurality of shockwave detectors; and,
   locating said first location in response to said step of determining a time of arrival of said shockwave.

12. A method of claim 11 wherein said relative time of arrival is based upon a plurality of times of arrival of said shockwave at a plurality of shockwave detectors.

13. A method of claim 12 wherein said step of detecting an arrival of said shockwave comprises the steps of detecting a change in a predetermined electrical characteristic of said liquid crystal material in response to a presence of said shockwave.

14. A method of claim 12 wherein said step of detecting an arrival of said shockwave comprises the steps of detecting a change in a predetermined optical characteristic of said liquid crystal material in response to a presence of said shockwave.

15. A method of claim 11 wherein said step of locating said first location comprises using a triangulation computation.

16. A method of claim 11 wherein said step of locating said first location comprises a determination of a row and a column.

17. An apparatus for detecting a tactile stimuli upon a viewing area of a liquid crystal display comprising:
   a liquid crystal material having a viewing surface;
   a plurality of shockwave detectors disposed about a periphery of said viewing surface; and
   means for performing a triangulation computation to determine a location of a point of tactile stimulation on said viewing surface, said means for performing being responsive to signals representative of a detection of a tap-generated shockwave, generated at said point of tactile stimulation, by said plurality of detectors.

18. An apparatus of claim 17 wherein said plurality of shockwave detectors comprises a plurality of optical sensors disposed on a layer having thin film transistors thereon, where said plurality of optical sensors measures an optical characteristic of a segment of said liquid crystal material.

19. An apparatus of claim 18 wherein said optical characteristic is a brightness of light reflection of a surface on an opposite side of said liquid crystal material from said layer.

20. An apparatus of claim 19 wherein said means for performing a triangulation computation determines a relative time of arrival of a shockwave at said plurality of shockwave detectors.

* * * * *